US005413843A

United States Patent [19]

Mann et al.

[11] Patent Number: 5,413,843

[45] Date of Patent: May 9, 1995

[54] INKABLE SHEET

[75] Inventors: Stephen Mann, Golchester; Roger N. Barker, Clacton on Sea; Graham A. Page, Ipswich; Stephen P. Corr, Chelmsford, all of United Kingdom

[73] Assignee: Imperial Chemical Industries PLC, London, United Kingdom

[21] Appl. No.: 925,191

[22] Filed: Aug. 6, 1992

[30] Foreign Application Priority Data

Aug. 15, 1991 [GB] United Kingdom ................. 9117642

[51] Int. Cl.[6] .......................... B41M 1/30; B32B 3/00

[52] U.S. Cl. .................................... 428/211; 428/332; 428/339; 428/481; 428/412; 428/473.5; 428/533; 428/508; 428/509; 428/510

[58] Field of Search ............... 428/481, 332, 339, 211, 428/533, 508, 509, 510

[56] References Cited

U.S. PATENT DOCUMENTS 4,880,695 11/1989 Rudd et al. ......................... 428/420
5,208,092 5/1993 Iqbal ................................... 428/211

FOREIGN PATENT DOCUMENTS 0262245 4/1988 European Pat. Off. .
0297108 1/1989 European Pat. Off. .
0409440 1/1991 European Pat. Off. ....... B41M 1/30
2151945 7/1985 United Kingdom .

OTHER PUBLICATIONS

Database Japio, No. 88-001578; 81-054581; and 81-099692.

*Primary Examiner*—P. C. Sluby
*Attorney, Agent, or Firm*—Cushman, Darby & Cushman

[57] ABSTRACT

An inkable sheet, especially suitable for use with aqueous based inks, having an ink-absorbent later substrate which, on depositing an aqueous droplet thereon, exhibits an advancing contact angle not exceeding 100° and has an ink absorption capacity not exceeding 35 grams of water per gram of the ink-absorbent layer. The contact angle of the sheet may be modified by the presence of a supercoat. This sheet has an excellent combination of characteristics even at high ink loadings, for example 300 dpi.

5 Claims, 1 Drawing Sheet

INKABLE SHEET

Figure 1:
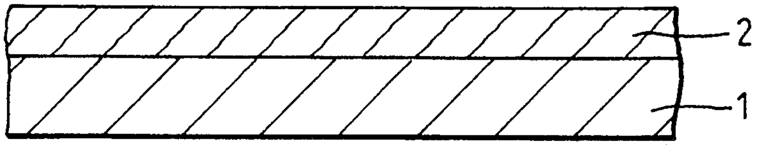

This invention relates to an inkable sheet, and in particular, to an inkable sheet suitable for use with a mechanical printing assembly, for example, an ink jet printer or a pen plotter.

With the recent proliferation of micro-computers and colour monitors there has been a rapid growth in the amount of information available for display in colour. Presentation of such information has created a demand for hard copy, for example—on paper sheets, but increasingly on transparent polymeric films which are capable of serving as imaged transparencies for viewing in a transmission mode. Preparation of the desired hard copy is conveniently effected by, for example, an ink jet printer or a pen plotter, using an aqueous or an aqueous-organic solvent-based ink.

Pen plotter assemblies are extensively used in drawing offices, and particularly in the generation of computer aided designs. The advent of transparent polymeric recording sheets has revealed that the formation thereon of inked images of acceptable quality usually requires the development of special, and expensive pens. Even so, pattern resolution remains a problem.

Ink jet printing is already established as a technique for printing variable information such as address labels, multi-colour graphics, and the like. A simple form of ink jet printer comprises an orifice plate coupled to an ink reservoir and a thermal heater for each orifice on the plate which, on application of a Voltage pulse, causes the ink adjacent to the heater to vapourise and thereby eject an ink droplet through the orifice at high velocity (e.g. up to 20 $ms^{-1}$) onto an ink receptive sheet. Movement of the ink jet may be computer controlled, and now characters may therefore be formed and printed at high speeds. To derive advantage from this high speed operating capability requires the use of an ink-receptive sheet having appropriate surface properties which will quickly absorb the high velocity ink droplet without blotting or bleeding thereby to provide suitable image quality.

To improve image resolution, ink jet printers have been developed which are capable of providing a greater density of ink droplets, for example up to about 300 dots per inch (dpi). For a given droplet size, the increased 'dpi' of such printers as compared with that of lower resolution printers has the effect of increasing the volume per unit area of ink to be absorbed by the recording medium.

In addition to providing acceptable image quality it is desirable for an ink receptive sheet to possess characteristics which enable an image which has been applied thereto to dry in a reasonable time and for the sheet to retain its mechanical integrity especially in the areas of high ink loading.

As the amount of ink deposited on an ink receptive sheet increases there is likely to be an increase in the drying time thereof and a point at which the mechanical integrity of the sheet becomes unacceptably poor, which my be indicated by, for example, wrinkling of the sheet and may lead to loss of the coating material from the substrate film during handling and storage. Indeed, it has been found that some ink receptive sheets which provide acceptable image quality with an ink jet printer having a dot placement density of about 180 dpi may tend to lose their mechanical integrity when used with an ink jet printer having a higher dot placement density of about 300 dpi thus giving poor image quality and poor handleability of the inkable sheet.

Additionally, high resolution printers, especially those for use in an office environment, may use aqueous-based inks having a water content of up to about 95%. It is therefore desirable that an ink receptive sheet suitable for use with such printers is capable of use with aqueous-based inks.

Consequently, in view of the market requirement for ever higher levels of image resolution, a need exists for an ink receptive sheet which can accept high ink loadings, thereby to provide a high resolution image, but which also retains its mechanical integrity and provides acceptable drying times.

As the ink loading of a sheet is increased, it may be expected that a corresponding increase in ink absorption capacity of an absorbent layer on the sheet would be necessary to allow the increased amount of ink to be absorbed to avoid an undesirable increase in image drying time.

However, we have now surprisingly found that problems due to poor mechanical integrity, especially at high ink loadings, may be reduced or substantially eliminated by providing an inkable sheet having a reduced ink absorption capacity together with a relatively hydrophilic surface. Such an inkable sheet also provides excellent image quality and satisfactory drying times at high ink loadings.

Accordingly, the present invention provides an inkable sheet comprising a substrate having on a surface thereof an ink-absorbent layer wherein the surface of the ink-absorbent layer remote from the substrate is such that on depositing an aqueous droplet thereon, the absorbent layer exhibits an advancing contact angle not exceeding 100° and has an ink absorption capacity not exceeding 35 grams of water per gram of the ink-absorbent layer (g/g).

An inkable sheet according to the invention is particularly suitable as a recording sheet for use with an automated printing assembly, such as an ink jet printer or a pen plotter especially for those assemblies which provide high ink loadings.

The present invention also provides a method of producing an inkable sheet which comprises applying to the surface of a substrate, a coating medium comprising an ink-absorbent material and a carrier and drying the said coating medium by removing a substantial amount for example at least 95% and preferably substantially all, of the carrier, to form an ink-absorbent layer on the surface of the substrate wherein the absorbent layer is such that a water droplet deposited thereon exhibits an advancing contact angle not exceeding 100° and which absorbent layer has an ink absorption capacity not exceeding 35 g/g.

Contact angles, ink absorption capacities and drying times referred to herein are measured by the hereinafter defined 'Test Methods'.

Desirably, on producing an inkable sheet according to this invention the ink absorbance capacity and contact angle exhibited thereby are within the range as hereinbefore specified within 1 day, desirably within 1 hour of production and optimally on forming the sheet or shortly thereafter.

The invention also provides an ink receptive sheet as hereinbefore described which is adapted for use with an aqueous-based ink in which the ink-absorbent layer of the sheet is of an essentially hydrophilic nature and exhibits a marked affinity for an aqueous-based ink thereby to absorb and retain an aqueous-based ink.

An inkable sheet according to the invention suitably has an ink absorption capacity of 1 to 35, preferably 1 to 30 and especially 1 to 15 g/g. A sheet having an ink absorption capacity in this range has excellent mechanical integrity, even at high ink loadings, for example 300 dpi.

An inkable sheet according to the invention preferably has a contact angle of 50° to 100°, desirably of 65° to 95° and especially 70° to 85°.

An inkable sheet having an absorbent layer which has a very low contact angle may be prone to flooding, especially if the absorbent layer has a low ink absorption capacity. This leads to adjacent ink droplets coalescing thus giving unacceptable image resolution. Furthermore, an inkable sheet having a relatively high contact angle together with a low ink absorption capacity may provide an image which is unacceptably faint.

Thus, by selecting an optimum range of Contact angle, a sheet which is less prone to flooding but which provides an acceptable image intensity may be secured.

The combination of ink absorption capacity and contact angle of an inkable sheet according to the invention provides a further benefit, in addition to improved mechanical integrity and image quality, in that, for the high ink loadings provided by commercially available automated printing assemblies, desirable drying times may be secured. The drying time is dependent on the ink applied to the sheet as well as the sheet itself. Suitably a sheet according to the invention provides a drying time not exceeding 15 minutes, preferably not exceeding 5 minutes and more preferably not exceeding 1 minute. Desirably sheets according to the invention have as short a drying time as possible.

The ink-absorbent layer suitably Comprises an ink-receptive resin. For example, the ink-absorbent layer conveniently comprises any hydrophilic resin, suitably having at least one hydrophilic moiety such as hydroxyl, carboxyl, amino, epoxy, vinyl, anhydride or sulphonic acid, or a blend of such resins, which can be coated onto the substrate to yield an absorbent layer capable of absorbing and retaining an aqueous-organic ink-solvent medium—for example, by swelling and which is capable of providing an absorbent layer having good clarity and preferably low haze.

Suitable resins for the production of an essentially hydrophilic ink-absorbent layer in accordance with the invention include cellulosics, such as nitrocellulose, carboxymethylcellulose and especially hydroxyethylcellulose; gelatins; vinyls, such as polyvinylacetate, and copolymers of vinyl chloride and vinyl acetate; acrylics, such as polyacrylic acid; and polyvinylpyrrolidones, as described in EP-A-0156532, EP-A-0232040 and EP-A-0233703.

Preferred resins comprise hydroxyethylcellulose resins for example NATROSOL 250L, a hydroxyethylcellulose available from Aqualon and especially modified hydroxyethylcellulose resins having hydrophobic groups such as hydrocarbyl groups, for example alkyl groups, having 2 to 25, desirably 5 to 18 and optimally 9 to 15 carbon atoms. A particularly preferred resin is NATROSOL PLUS, a modified hydroxyethyl cellulose available from Aqualon.

Desirably the ink absorbent layer comprises a blend of hydroxyethylcellulose and such a modified hydroxyethyl cellulose resin, the modified resin being present in an amount of at least 55% and optimally 55 to 65% by weight of the total layer, the balance preferably comprising hydroxyethylcellulose. A highly preferred resin composition comprises 60% of NATROSOL PLUS resin and 40% of NATROSOL 250L resin.

In order to secure an inkable sheet having reduced ink absorption capacity, the absorbent layer may comprise a high molecular weight polymer for example a hydroxyethylcellulose such as NATROSOL 250HHX or NATROSOL 250H both available from Aqualon. However the relatively high viscosity of solutions of such polymers may render them unsuitable for application onto a substrate film by a continuous process although casting or high temperature application methods may provide an acceptable ink-absorbent later.

Desirably, a reduced ink absorption capacity is secured by incorporating into the ink absorbent layer, a polymer which is capable of cross-linking either with itself and/or on addition of a cross-linking agent.

By "cross-linking" is meant the formation of intermolecular and/or intramolecular covalent and/or ionic bonds.

Accordingly, another aspect of the invention provides an inkable sheet comprising a substrate having on a surface thereof an ink-absorbent layer comprising a cross-linkable polymer and optionally a cross-linking agent wherein the surface of the ink-absorbent layer remote from the substrate is such that on depositing an aqueous droplet thereon, the absorbent layer exhibits an advancing contact angle not exceeding 100° and has an ink absorption capacity not exceeding 35 grams of water per gram of the ink-absorbent layer (g/g).

The selection of a cross-linking agent is dependent on the nature of the other materials forming the ink absorbent layer and conveniently is selected to provide sufficient cross-linking in the absorbent layer to provide the requisite ink absorption capacity. Examples of suitable cross-linking agents include polyepoxy, polycarboxylic, polyisocyanate, polyaldehyde, polyol compounds and acid anhydrides.

Where the ink absorbent layer comprises a resin having hydroxyl groups such as hydroxyethylcellulose for example NATROSOL 250L resin available from Aqualon, a polyimine, for example POLYMIN polyethylene imine, available from BASF and/or a formaldehyde for example CYMEL 1172, available from American Cyanamid, provide particularly desirable cross-linking agents.

If a cross-linking agent is present in the ink absorbent layer, the amount thereof will be dependent on the particular components in the layer but suitably is present in an amount not exceeding 30%, preferably between 0.1 and 10%, especially 0.5 to 5% and optimally 1 to 2.5% by weight of the ink absorbent layer.

Cross-linking may also be effected by the migration of a cross-linking agent from a layer adjacent to the ink-absorbent into the ink-absorbent layer, hence the amount of cross-linking, and so the characteristics of the ink-absorbent layer, may vary with time.

Suitable self cross-linking polymers include those which have cross-linkable functional groups for example hydroxyl, amino and carboxylic groups.

To secure the desired ink absorption capacity, in addition to or as an alternative to cross-linking, the ink absorbent layer suitably comprises a polymer which comprises network-forming groups.

By "network-forming" is meant the formation of weak intermolecular and/or intramolecular non-covalent bonds for example hydrogen bonds and van der Waals bonds between, for example, hydrophobic substituents, desirably hydrocarbyl groups, especially aliphatic hydrocarbon chains.

Accordingly, a further aspect of the invention provides an inkable sheet comprising a substrate having on a surface thereof an ink-absorbent layer comprising a network forming polymer wherein the surface of the ink-absorbent layer remote from the substrate is such that on depositing an aqueous droplet thereon, the absorbent layer exhibits an advancing contact angle not exceeding 100° and has an ink absorption capacity not exceeding 35 grams of water per gram of the ink-absorbent layer (g/g).

Where the ink absorbent layer comprises a polymer having network-forming groups we have found that a particularly advantageous inkable sheet may be secured if the ink absorption capacity does not exceed 20 g/g and preferably does not exceed 15 g/g.

The solution viscosity of a polymer resin or blend of such resins may provide an indication of the degree of network-formation therein. Thus where a suitable ink absorption capacity is secured by network-formation, the solution viscosity of the components which form the ink absorbent layer, excluding any additive compounds which my be present, is suitably up to 100000, preferably 300 to 50000, more preferably 500 to 10000 and especially 700 to 5000 mPa s at 25° C. when measured as a 2% solution in water using a Brookfield Viscometer fitted with spindle No 4 and operated at 12 rpm. A solution having a viscosity in this range will suitably provide sufficient network-formation to secure the requisite ink-absorption capacity yet still be sufficiently fluid to avoid problems in coating onto the substrate base.

If desired, the ink-absorbent resin my also comprise additive compounds such as a plasticiser, that is any additive which my be incorporated into a polymeric material to improve its softness, processability and flexibility. They are well known per se in the plastics art, particularly for modifying the characteristics of polyvinyl chloride, and are usually organic materials in the form of moderately high molecular weight liquids or low melting solids. Most commonly they comprise esters of carboxylic acids or phosphoric acid, although hydrocarbons, halogenated hydrocarbons, ethers, glycols, polyglycols and hydrogenated or epoxydised drying oils (eg soya bean oil) may also be employed, as described in EP-A-0232040.

An additive compound such as a surfactant may be employed to improve the ageing behaviour of the ink-absorbent layer and promote absorption and drying of a subsequently applied ink. Suitable surfactants include a non-ionic, fluorocarbon surfactant, or a cationic surfactant, such as a quaternary ammonium salt. Additionally a humectant, such as glycerol, may be employed.

If desired, the ink-absorbent layer may additionally comprise a particulate filler additive compound to improve the handling characteristics of the sheet. Suitable fillers include oxides of metals-or metalloids, such as silica, desirably of a particle size not exceeding 20, and preferably less than 12, for example 8 μm. The amount of filler employed will be dictated by the desired characteristics of the sheet but will generally be low to ensure that the optical characteristics (such as haze) of the sheet remain substantially unimpaired. Typical filler loadings are of the order of less than 2.0, and preferably from 0.5 to 1.0% by weight of the resin component(s).

Other additive compounds conventionally employed in the ink-absorbent layer of an inkable sheet may be incorporated into the ink-absorbent layer of an inkable sheet according to the invention.

The ink-absorbent layer is conveniently applied to the substrate by a conventional coating technique—for example, by deposition from a solution or dispersion of the resin(s) in a volatile medium, such as an aqueous or organic solvent medium.

Drying of the applied ink-absorbent layer my be effected by conventional drying techniques—for example, by suspending the coated substrate in a hot air oven maintained at an appropriate temperature. A drying temperature of about 120° C. is usually suitable for a polyester substrate.

The thickness of the dry ink-absorbent layer may vary over a wide range, but is conveniently 50 μm or less, especially within a range of from 8 to 30, and preferably from 10 to 20, for example 12 μm.

A substrate for use-in the production of an inkable sheet according to the present invention suitably comprises any polymeric material capable of forming a self-supporting opaque, or preferably transparent, film or sheet.

By a "self-supporting film or sheet" is meant a film or sheet capable of independent existence in the absence of a supporting base.

Suitable thermoplastics materials for use in the production of a substrate include a cellulose ester, eg cellulose acetate, polystyrene, a polymer and copolymer of vinyl chloride, polysulphone, a homopolymer or copolymer of a 1-olefin, such as ethylene, propylene and but-1-ene, a polyamide, a polycarbonate, and, particularly, a synthetic linear polyester which may be obtained by condensing one or more dicarboxylic acids or their lower alkyl (up to 6 carbon atoms) diesters, eg terephthalic acid, isophthalic acid, phthalic acid, 2,5-2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly an aliphatic glycol, eg ethylene glycol, 1,3-propanediol, 1,4-butanediol, neopentyl glycol and 1,4-cyclohexanedimethanol. A polyethylene terephthalate film is particularly preferred, especially such a film which has been biaxially oriented by sequential stretching in two mutually perpendicular directions, typically at a temperature in the range 70° to 125°, and preferably heat set, typically at a temperature in the range 150° to 250°, for example as described in GB-A-838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203, particularly suitable materials being those sold by ICI PLC under the Registered Trade Mark STABAR. Blends of these polymers may also be employed.

Suitable thermoset resin substrate materials include addition—polymerisation resins—such as acrylics, vinyls, bis-maleimides and unsaturated polyesters, formaldehyde condensate resins—such as condensates with urea, melamine or phenols, cyanate resins, functionalised polyesters, polyamides or polyimides.

The substrate is suitably of a thickness from 25 to 300, particularly from 50 to 175, and especially from 75 to 125 μm.

To promote adhesion of the ink-absorbent layer to a polymeric substrate, it is desirable first to treat a surface of the substrate with a priming medium. Creation of a priming layer is conveniently effected by treating a surface of the polymer substrate with an agent known in the art to have a solvent or swelling action on the substrate polymer. Examples of such conventional agents, which are particularly suitable for the treatment of a polyester substrate, include a halogenated phenol dissolved in a common organic solvent eg a solution of p-chloro-m-cresol, 2,4-dichlorophenol, 2,4,5- or 2,4 6-trichlorophenol or 4-chlororesorcinol in acetone or methanol. In addition, and preferably, the priming solution may contain a partially hydrolysed vinyl chloride-vinyl acetate copolymer. Such a copolymer conveniently contains from 60 to 98% of vinyl chloride, and from 0.5 to 3% of hydroxyl units, by weight of the copolymer. The molecular weight (number average) of the copolymer is conveniently in a range of from 10,000 to 30,000, and preferably from 16,500 to 25,000. Desirably the priming layer comprises a polyester material.

If desired, a plurality of priming layers may be sequentially applied to a substrate.

The priming agent is suitably applied at a concentration level which will yield a priming layer having a relatively thin dry coat thickness—for example, generally less than 2, and preferably less than 1 μm.

An inkable sheet according to the invention my comprise a supercoat and/or a backing layer which may be the same as each other or different as desired. A supercoat may be applied to the ink-absorbent layer to improve the machine-handleability and to protect the ink absorbent layer. Moreover, the provision of a supercoat is desirably provided to alter the advancing contact angle of the surface of the film while retaining substantially the same ink-absorption capacity. Thus the mechanical integrity of the film is not significantly impaired but by employing a particular supercoat, a greater control of the ink droplets applied thereto may be secured.

Accordingly, a further aspect of the invention provides an inkable sheet comprising a substrate having on one surface thereof an ink-absorbent layer having an ink-absorption capacity not exceeding 35 g of water per gram of the ink absorbent layer and, on the ink-absorbent layer, a supercoat which is permeable to an ink applied to the sheet whereby at least part, preferably substantially all of the ink passes through the supercoat and is absorbed by the ink-absorbent layer.

As the nature of the supercoat affects the shape of the ink droplet, the supercoat may be selected depending, inter alia, on the ink, to provide greater control of the shape of the ink droplets. A practical benefit of this control is that premature coalescing of the droplets and hence formation of undesirable ink 'puddles' may be reduced which allows higher resolution images to be printed. The permeability of the supercoat and the ink-absorption capacity of the ink-absorbent layer allow the ink to be retained and the sheet to retain its mechanical integrity.

The supercoat desirably exhibits a contact angle in the range 45° to 120° and preferably 50° to 100°. As desired, the supercoat may be of thickness 0.1 to 3 μm, preferably 0.25 to 2 μm and especially 0.5 to 1.5 μm.

The supercoat may comprise a cellulosic material, for example carboxymethyl cellulose and hydroxyethyl cellulose, an acrylic for example polyacrylamide, an acrylic copolymer of for example, acrylic acid and acrylamide, a polyalkylene oxide for example polyethyleneoxide, a copolymer of polyethylene oxide and polypropylene oxide, a vinyl polymer for example polyvinylpyrrolidone and a mixture of polyvinylpyrrolidone and a hydroxylated carboxylic acid or any mixture of such materials.

The supercoat preferably comprises a filler, particularly of the kind hereinbefore described. The filler loading in the supercoat is generally less than 2% by weight of the resin component(s), and is preferably less than that of the ink-absorbent layer, for example from 0.1 to 0.5% by weight.

A backing layer may be applied to the opposite surface of the substrate to the ink-absorbent layer to improve the machine-handling properties and reduce curling of the inkable sheet. The backing layer suitably comprises any of the materials suitable for the formation of the ink-absorbent layer.

The adhesion of the backing layer to the base sheet may be improved by first treating the surface of the base sheet with a priming medium as hereinbefore described. Priming media which are suitable for improving the adhesion of the ink-absorbent layer to the base sheet may also be used with the backing layer.

An inkable sheet according to the present invention is particularly suitable for use in the preparation of inked transparencies for use in a transmission mode, for example—with an overhead projector. Absorption of the solvent medium of the applied ink into the ink-absorbent layer ensures that the surface of the film quickly becomes touch dry, and facilitates immediate use of the imaged sheet.

The invention is illustrated by reference to the accompanying drawings in which:

FIG. 1 is a schematic elevation (not to scale) of a portion of an inkable sheet comprising a substrate layer (1) to one surface of which is bonded an ink-absorbent layer (2).

Figure 2:
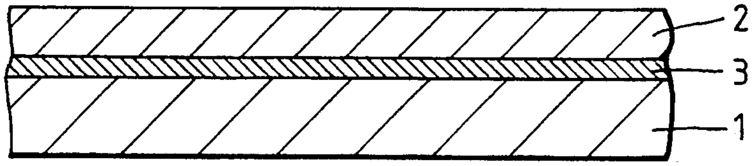
Figure 3:
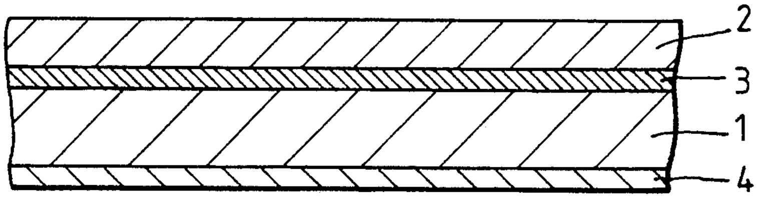

FIG. 2 is a fragmentary schematic elevation of a similar sheet to that illustrated in FIG. 1 in which the ink-absorbent layer (2) is bonded to the substrate layer (1), by an intermediate priming layer (3), and FIG. 3 is a fragmentary schematic elevation of a similar sheet to that illustrated in FIG. 2 in which an additional backing layer (4) is bonded to the second surface of the substrate layer (1).

Figure 4:
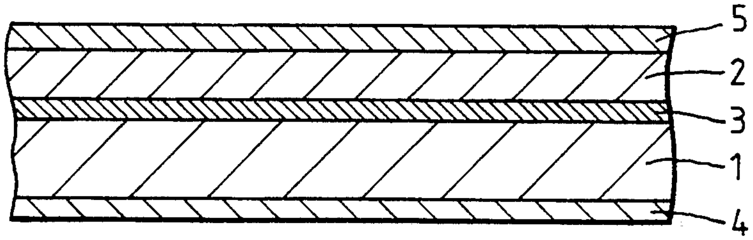

FIG. 4 is a fragmentary schematic elevation of a similar sheet to that illustrated in FIG. 3 in which a supercoat layer (5) is bonded to the surface of the ink absorbent layer (2) which is remote from the substrate (1).

The invention is further illustrated by reference to the following Examples.

TEST METHODS

1. Contact Angle: was measured by clamping a 10 cm×2 cm strip of the film, the contact angle of which is to be determined, to a support inclined at an angle of 45° to the horizontal and depositing on the surface of the film, 10 to 50 μl of distilled water as a small droplet at a rate of application of 500 μl per minute. The movement of the droplet along the film was recorded using a video camera and printer. By viewing the video recording, the angle between the leading edge of the droplet and the surface of the film, measured through the droplet, was determined. This angle is known as the advancing contact angle and is referred to herein as the "contact angle" of the film.

2. Ink Absorption Capacity: was measured according to a method based on the Cobb Absorption Test, by clamping a pre-weighed 11.5 cm diameter circular sheet of the film having a coating of known thickness between a base-plate and a metal ring and then depositing 100 ml of distilled water on the film coating. After 10 seconds the excess water on the film was removed and the film was re-weighed to determine, by difference, the amount of water absorbed. The capacity of the coating was expressed as grams of water absorbed per gram of the coating.

3. Drying times: were measured by passing the film to be tested through a printer (Canon BJ 10-e and Hewlett-Packard Deskjet 500C) and printing onto the film, a 1 cm square of ink on the fullest ink loading. The ink square was then wiped lightly with a clean finger and the time after which the square was not smudged by the wipe of the finger was recorded as the drying time of the film. Drying times referred to herein are measured at a temperature of 20° C. and a relative humidity of 60%.

4. Mechanical Integrity: was measured by passing the film to be tested through a Canon BJ 10-e printer and printing onto the film, a 2 cm square of black ink on a range of increasing ink loadings from grey up to the fullest ink loading. The ink squares were allowed to dry and the films were then visually inspected for any raised or wrinkled areas. To have an acceptable mechanical integrity, the film had to show no wrinkling in the area of highest ink loading.

5. Ink Droplet Coalescence: was measured by passing the inkable sheet through a Hewlett-Packard Deskjet 500C printer and printing onto the film an array of 2 cm squares of ink having various fill patterns from 10% fill to 100% fill. The films were then viewed under a microfiche reader and visually assessed for the degree of ink coalescence occurring.

EXAMPLE 1

One surface of a biaxially oriented, uncoated, polyethylene terephthalate film substrate of about 100 μm thickness was primed with a polyester solution to provide a prime layer of approximately 0.2 μm thickness.

The primed surface was then coated with a coating composition comprising the following components;

| | |
|---|---|
| NATROSOL PLUS (a modified hydroxyethylcellulose available from Aqualon) | 647 g |
| NATROSOL 250L (a hydroxyethylcellulose available from Aqualon) | 432 g |
| Methanol | 15.9 liters |
| Distilled Water | 2.0 liters |

The coated substrate was dried at a temperature of 110° C. for 5 minutes to yield a network-forming ink-absorbent layer of approximately 7 μm thickness. The viscosity of a 5% solution (85:15 methanol:water) of a 6 parts NATROSOL PLUS to 4 parts NATROSOL 250L blend was measured with a Brookfield Viscometer at 25° C, as 16000 cPs.

EXAMPLE 2

The procedure of Example 1 was repeated with the exception that the primed sheet was coated with a composition comprising the following components;

| | |
|---|---|
| NATROSOL 250L | 1064 g |
| POLYMIN (polyethyleneimine, available from BASF) | 15 g |
| Methanol | 15.9 liters |
| Distilled Water | 2.0 liters |

The coated substrate was dried at a temperature of 110° C. for 5 minutes to yield a cross-linked ink-absorbent layer of approximately 7 μm thickness.

EXAMPLE 3

The procedure of Example 1 was repeated with the exception that the primed sheet was coated with a composition comprising the following components;

| | |
|---|---|
| NATROSOL 250L | 1064 g |
| CYMEL 1172 (tetramethyl glycolury-formaldehyde, available from American Cyanamid) | 15 g |
| Methanol | 15.9 liters |
| Distilled Water | 2.0 liters |

The coated substrate was dried at a temperature of 110° C. for 5 minutes to yield a cross-linked ink-absorbent layer of approximately 7 μm thickness.

EXAMPLE 4

An inkable sheet procuced according to Example 1 was further treated to provide a supercoat on top of the ink-absorbent layer. The supercoat was formed by depositing a 0.2% w/w dispersion of polyalkylamine in methanol onto the ink-absorbent layer and drying the dispersion at 85° C. to provide a supercoat of approximately 0.5 μm thickness.

EXAMPLE 5

The procedure of Example 4 was repeated with the exception that the supercoat (0.5 μm thickness) was formed from a 0.2% w/w dispersion of polyvinylpyrrolidone in methanol.

EXAMPLE 6

The procedure of Example 4 was repeated with the exception that the supercoat (0.5 μm thickness) was formed from a 0.2% w/w dispersion of a mixture of polyvinylpyrrolidone and a hydroxylated carboxylic acid in methanol.

EXAMPLE 7

The procedure of Example 4 was repeated with the exception that the supercoat (0.5 μm thickness) was formed from a 0.2% w/w dispersion of polyethyleneoxide in methanol.

EXAMPLE 8 (COMPARATIVE)

This is an Example not according to the invention. The procedure of Example 1 was repeated with the exception that the primed sheet was coated with a composition comprising the following components;

| | |
|---|---|
| NATROSOL 250L | 1079 g |
| Methanol | 15.9 liters |
| Distilled Water | 2.0 liters |

The coated substrate was dried at a temperature of 110° C. for 5 minutes to yield a cross-linked ink-absorbent layer of approximately 7 μm thickness.

EXAMPLE 9

The ink absorption capacity, contact angle, drying time, ink droplet coalescence and the amount of wrinkling of inkable sheets produced in Examples 1 to 7 and comparative Example 8 were measured using the Test Methods as hereinbefore described. The results are listed in Table 1.

TABLE 1

| Example | Contact Angle (°) | Absorption Capacity (g/g) | Coalescence | Drying Time (minutes) Canon | HPDeskjet | Wrinkling |
|---|---|---|---|---|---|---|
| 1 | 85 | 10 | LOW | 1 | 4 | NO |
| 2 | 70 | 12 | MEDIUM | — | — | NO |
| 3 | 60 | 20 | HIGH | — | — | NO |
| 4 | 84 | 10 | LOW | 1 | 5 | NO |
| 5 | 75 | 10 | LOW | 1 | 4 | NO |
| 6 | 118 | 10 | LOW | 1 | 4 | NO |
| 7 | 48 | 10 | HIGH | 1 | 4 | NO |
| 8 (comparative) | 60 | 50 | HIGH | 1 | 4 | YES |

The above results illustrate that an inkable sheet according to the invention exhibits excellent mechanical integrity while retaining an acceptable drying time for the ink. The results further illustrate that the contact angle may be modified by the provision of a supercoat and that acceptable droplet coalescence may be secured without affecting significantly the ink absorption capacity and the wrinkling of the sheet.

We claim:

1. An inkable sheet comprising a substrate having on a surface thereof an ink-absorbent layer comprising hydroxy ethyl cellulose and a hydroxy ethyl cellulose modified to include a hydrophobic group, the surface of the ink-absorbent layer remote from the substrate being such that upon depositing a droplet of distilled water thereon, the absorbent layer exhibits an advancing contact angle not exceeding 100° and has an ink absorption capacity not exceeding 35 grams of water per gram of the ink-absorbent layer.

2. An inkable sheet according to claim 1 in which the components which form the ink-absorbent layer, without additives, have solution viscosity of up to 100000 mPa s at 25° C. measured as a 2% solution in water using a Brookfield Viscometer fitted with spindle No 4 and operated at 12 rpm.

3. An inkable sheet according to claim 1 in which the modified hydroxyethylcellulose resin is present in an amount of at least 55% by weight of the ink-absorbent layer.

4. An inkable sheet according to claim 1 wherein the ink-absorbent layer also comprises a cross-linking agent.

5. An inkable sheet according to claim 4 wherein the cross-linking agent comprises at least one member of the group consisting of polyimine and formaldehyde.

* * * * *